(12) United States Patent
Plant

(10) Patent No.: US 8,776,724 B1
(45) Date of Patent: Jul. 15, 2014

(54) ANIMAL FEEDER INTEGRAL WITH VEHICLE BUMPER

(75) Inventor: James C. Plant, San Antonio, TX (US)

(73) Assignee: Trophy Hunting Development, L.L.C., Boerne, TX (US)

( * ) Notice: Subject to any disclaimer, the term of this patent is extended or adjusted under 35 U.S.C. 154(b) by 0 days.

(21) Appl. No.: 12/655,054

(22) Filed: Dec. 22, 2009

(51) Int. Cl.
*A01K 5/00* (2006.01)

(52) U.S. Cl.
USPC .................................... 119/57.91; 239/681

(58) Field of Classification Search
USPC ............ 119/57.91, 51.01; 239/661, 663, 689, 239/687, 655, 658, 659, 665, 668, 669, 239/681; 293/117
See application file for complete search history.

(56) References Cited

U.S. PATENT DOCUMENTS

| | | | |
|---|---|---|---|
| 564,849 A | 7/1896 | Stewart, Jr. | |
| 1,239,404 A | 9/1917 | Knoll, Jr. | |
| 1,355,399 A | 10/1920 | Kelley | |
| 1,745,705 A * | 2/1930 | Nordquist | 291/47 |
| 2,163,911 A * | 6/1939 | Lintern | 291/44 |
| 2,221,266 A | 11/1940 | Roach | |
| 2,243,896 A | 6/1941 | Cupples | |
| 2,314,109 A | 3/1943 | Smith | |
| 2,322,171 A * | 6/1943 | Spatz | 291/36 |
| 2,393,849 A * | 1/1946 | Werts | 414/502 |
| 2,598,977 A | 6/1952 | Dale | |
| 3,020,881 A * | 2/1962 | Strom | 119/58 |
| 3,195,508 A | 7/1965 | Lehman | |
| 3,322,429 A * | 5/1967 | Cervelli | 239/670 |
| 3,438,585 A * | 4/1969 | Buchmann | 239/665 |
| 3,471,070 A | 10/1969 | Olson | |
| 3,501,170 A | 3/1970 | Da Valle | |
| 3,606,385 A | 9/1971 | Johannes | |
| 3,614,136 A | 10/1971 | Dent | |
| 4,027,627 A | 6/1977 | Fillion | |
| 4,166,581 A * | 9/1979 | Hetrick | 239/683 |
| 4,401,266 A * | 8/1983 | Funkhouser | 239/7 |
| 4,565,159 A * | 1/1986 | Sweeney | 119/53 |
| 4,674,782 A * | 6/1987 | Helber | 293/106 |
| 4,907,538 A | 3/1990 | Helmle | |
| 4,961,604 A | 10/1990 | Kisner | |
| 4,986,220 A | 1/1991 | Reneau | |
| 5,016,932 A | 5/1991 | Carter | |
| 5,038,981 A | 8/1991 | McDaniel | |

(Continued)

OTHER PUBLICATIONS

Photograph: Texas Hunter Products Spreader (Author/Date Unknown; Published in US).

(Continued)

*Primary Examiner* — Rob Swiatek
*Assistant Examiner* — Ebony Evans
(74) *Attorney, Agent, or Firm* — Wayne J. Colton, Inc.

(57) ABSTRACT

An integral animal feeder and bumper assembly for dispensing animal foodstuff from a vehicle includes an impact member to fend off blows to the vehicle, a hopper to store therein a quantity of substantially granular foodstuff such as, for example, feed corn, and a dispenser to selectively discharge from the hopper foodstuff contained in the hopper. The hopper is substantially contained with the extents of the impact member and/or the aesthetic coverings thereof. In this manner, assembly is adapted to function as a road feeder with little or no interference with other features of the vehicle configuration such as, for example, utilization of the tailgate and/or towing hitch, legal display of the license plate associated with the vehicle, access to the rear area of the vehicle and the like.

21 Claims, 7 Drawing Sheets

(56) References Cited

U.S. PATENT DOCUMENTS

| | | | |
|---|---|---|---|
| 5,135,274 A | 8/1992 | Dodd | |
| 5,143,289 A | 9/1992 | Gresham | |
| 5,170,749 A | 12/1992 | Collie, III | |
| 5,364,142 A * | 11/1994 | Coiner | 293/117 |
| 5,368,192 A | 11/1994 | Ransom, II | |
| 5,460,420 A * | 10/1995 | Perkins et al. | 293/106 |
| 5,582,441 A * | 12/1996 | Frost | 291/2 |
| 5,732,652 A | 3/1998 | Allen | |
| 5,820,035 A | 10/1998 | Johnson | |
| 5,823,585 A | 10/1998 | Tanguay | |
| 5,979,953 A | 11/1999 | Rinehart | |
| 6,186,731 B1 * | 2/2001 | Vickers et al. | 414/519 |
| 6,209,808 B1 * | 4/2001 | Anderson | 239/682 |
| 6,547,169 B1 * | 4/2003 | Matousek et al. | 239/661 |
| 6,598,914 B1 * | 7/2003 | Dixon | 293/106 |
| 6,698,997 B2 * | 3/2004 | Arne et al. | 414/502 |
| 6,709,036 B1 * | 3/2004 | Evans | 293/120 |
| 6,722,590 B2 * | 4/2004 | Kost et al. | 239/687 |
| 6,752,328 B2 | 6/2004 | Sauls | |
| 6,893,340 B1 * | 5/2005 | Schmidt et al. | 460/111 |
| 6,920,841 B2 | 7/2005 | Meritt | |
| 7,222,583 B2 | 5/2007 | Foster | |
| 7,252,049 B2 | 8/2007 | Ginsberg | |
| 7,281,675 B2 * | 10/2007 | Elrod et al. | 239/663 |
| 7,293,723 B2 * | 11/2007 | Niemela et al. | 239/672 |
| 7,306,175 B1 * | 12/2007 | Farmer | 239/666 |
| 7,306,270 B2 | 12/2007 | Helms | |

OTHER PUBLICATIONS

Photograph: Ultramatic Low Profile Spreader (Author/Date Unknown; Published in US).

Photograph: Monarch Spreader (Author/Date Unknown; Published in US).

Photograph: All Seasons Feeders Spreader (Author/Date Unknown; Published in US).

* cited by examiner

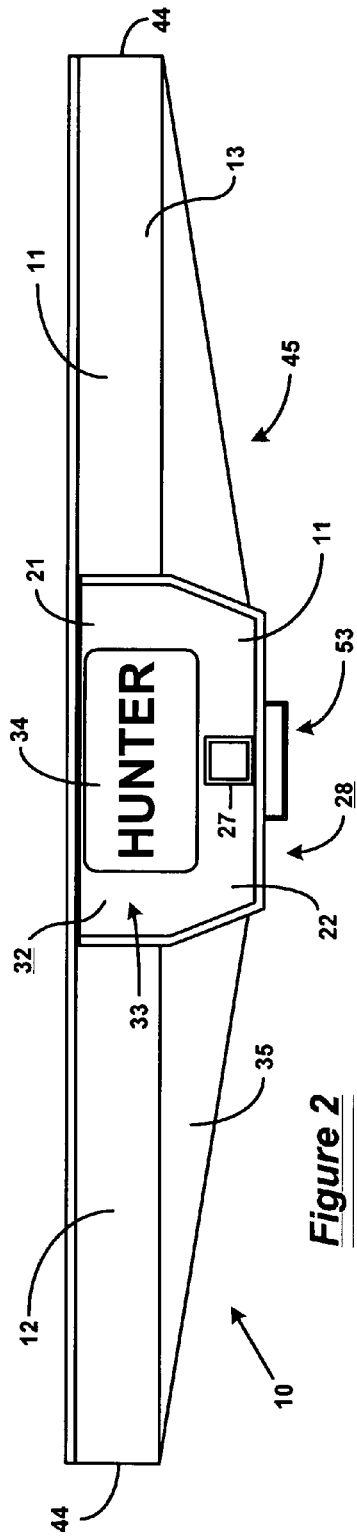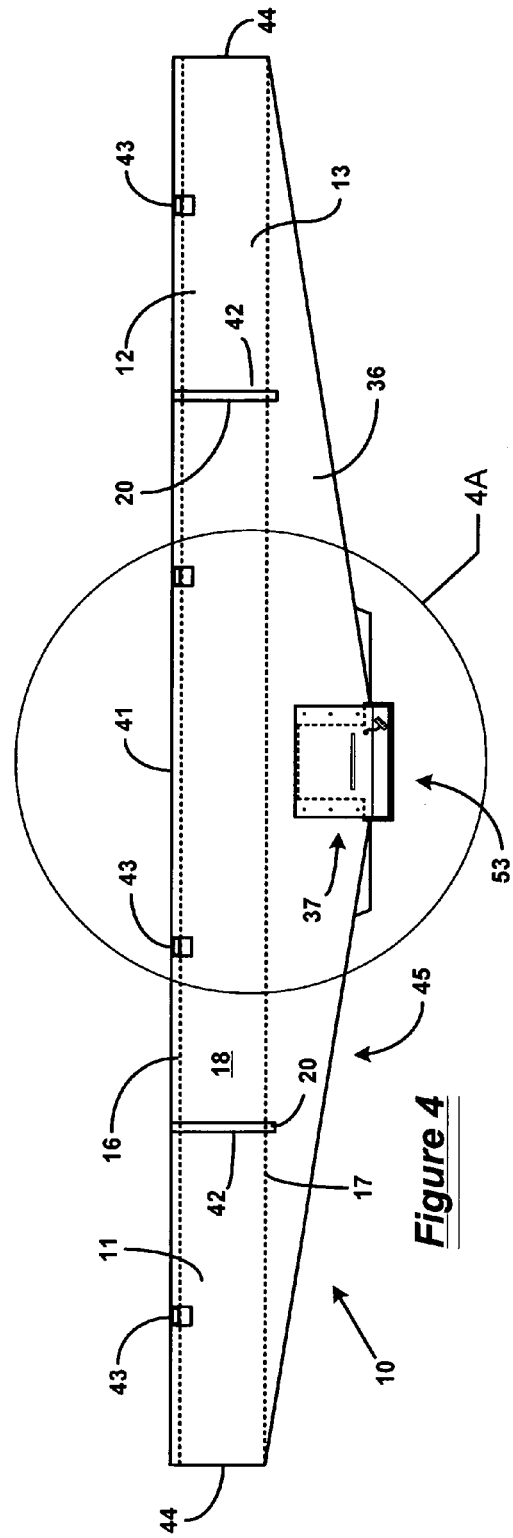

ANIMAL FEEDER INTEGRAL WITH VEHICLE BUMPER

FIELD OF THE INVENTION

The present invention relates to animal husbandry. More particularly, the invention relates to an animal feeder integrally constructed with a vehicle bumper, the integral feeder and bumper being specifically adapted to form a road feeder that may be utilized without interference with other features of the vehicle configuration.

BACKGROUND OF THE INVENTION

It is commonplace to use portable feeders for distributing granular foodstuffs such as, for example, feed corn for consumption by game such as, for example, deer. Additionally, a particular feeder, known in the art as a "road feeder" is particularly adapted to be affixed to the rear portion of a vehicle for dispensing such foodstuffs while "on the move" or while temporarily at a particular location. Invariably, however, the known "road feeders" may only be carried in the bed of truck or supported from a towing hitch provided on the truck. Additionally, most of the known feeders prevent full utilization of the either the truck bed or the tailgate of the truck and all of the known feeders occlude the license plate of the vehicle. As a result, these feeders, which are generally heavy and cumbersome, must be removed for legal highway travel and/or utilization of the truck bed and/or towing hitch of the vehicle and replaced for use in the field.

It is therefore an overriding object of the present invention to improve over the prior art in the provision of a road feeder that completely eliminates all of these long known, but otherwise unresolved disadvantages of the prior art. Additionally, it is an object of the present invention to provide such a road feeder that is aesthetically similar to an ordinary bumper structure and also provides the full measure of protection afforded ordinary bumper structures.

SUMMARY OF THE INVENTION

In accordance with the foregoing objects, the present invention—an integral animal feeder and bumper assembly—generally comprises a bumper adapted to fend off blows to a vehicle; a hopper adapted to store therein a quantity of substantially granular foodstuff; a dispenser adapted to selectively discharge from said hopper foodstuff contained in said hopper; and wherein said hopper is substantially contained within the extents of said bumper.

The bumper, which comprises at least one impact member, may also include one or more aesthetic coverings. In at least one embodiment of the present invention, the dispenser, which may comprise a spreader, is selectively detachable from the integral animal feeder and bumper assembly for utilization separate and apart from the assembly.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 2 shows, in a front elevational view, the integral feeder and bumper assembly of FIG. 1;

FIG. 4 shows, in a rear elevational view, the integral feeder and bumper assembly of FIG. 1;

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
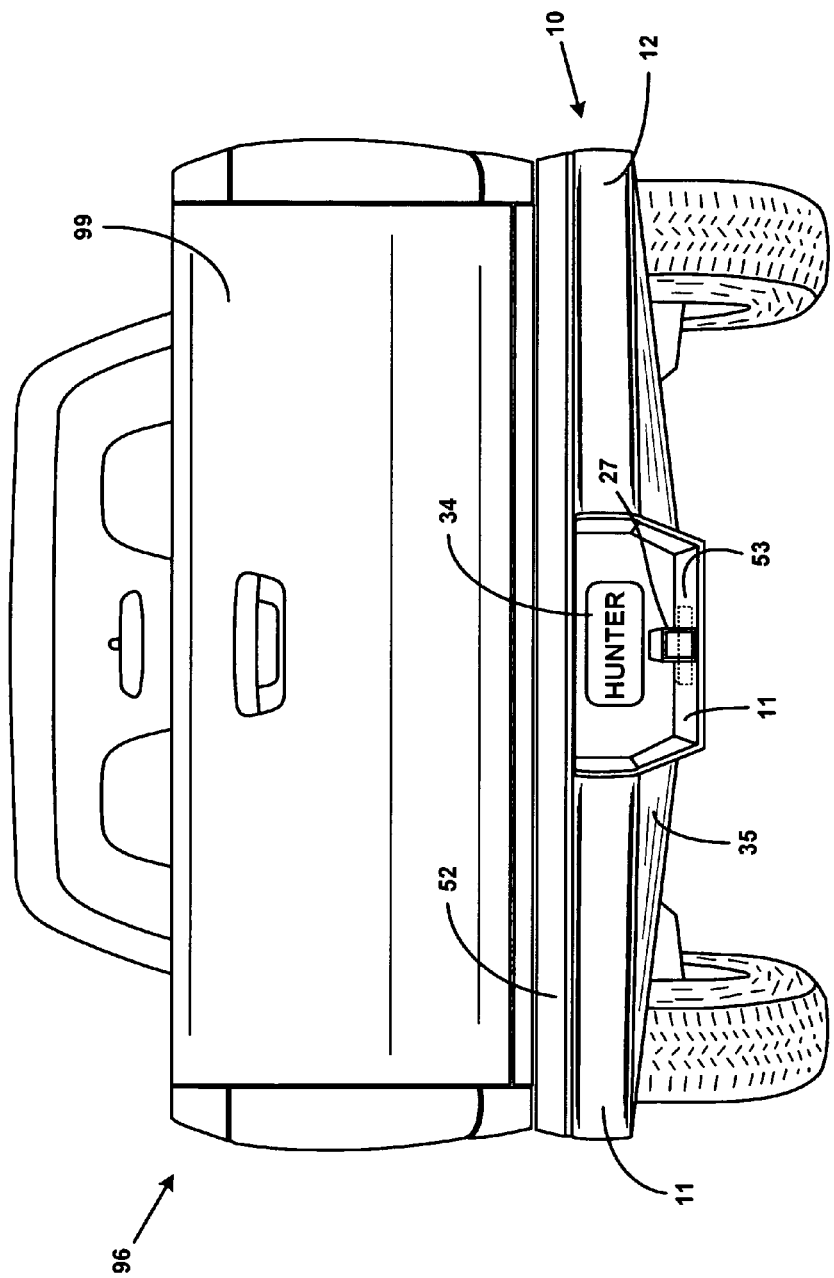
FIG. 1 shows, in a front perspective view, the preferred implementation of the integral animal feeder and bumper assembly of the present invention as said implementation is operationally affixed to the rear portion of a medium duty truck.
Figure 3:
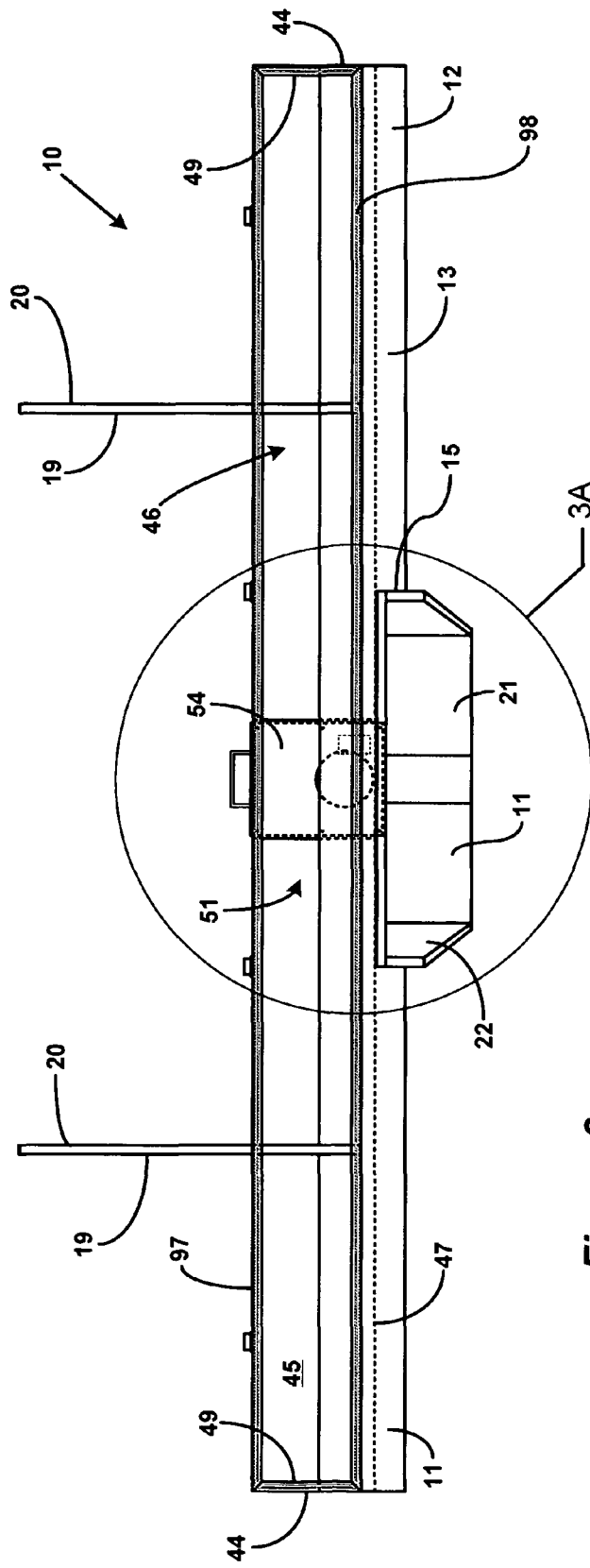
FIG. 3 shows, in a top plan view, the integral feeder and bumper assembly of FIG. 1, the lid thereof being omitted from the figure in order to more clearly show the components thereof.

Referring now to the figures, and to FIGS. 1 through 3 in particular, the integral animal feeder and bumper assembly 10 of the present invention, as specifically adapted for dispensing animal foodstuff from a vehicle 96, is shown to generally comprise an impact member 11 adapted to fend off blows to the vehicle 96; a hopper 46 adapted to store therein a quantity of substantially granular foodstuff such as, for example, feed corn; and a dispenser 53 adapted to selectively discharge from the hopper 46 foodstuff contained in the hopper 46. As will be better understood further herein, the most preferred implementation of the present invention contemplates that the hopper 46 will be substantially contained within the extents of the impact member 11 and/or the aesthetic coverings thereof. In this manner, the present invention is specifically adapted to function as a road feeder with little or no interference with other features of the vehicle configuration such as, for example, utilization of the tailgate 99 of the vehicle 96, utilization of a towing hitch such as, for example, the receiver hitch tube 27 discussed further herein, proper and legal display of the license plate 34 associated with the vehicle 96, access to the rear area of the vehicle 96 and the like.

Figure 3A:
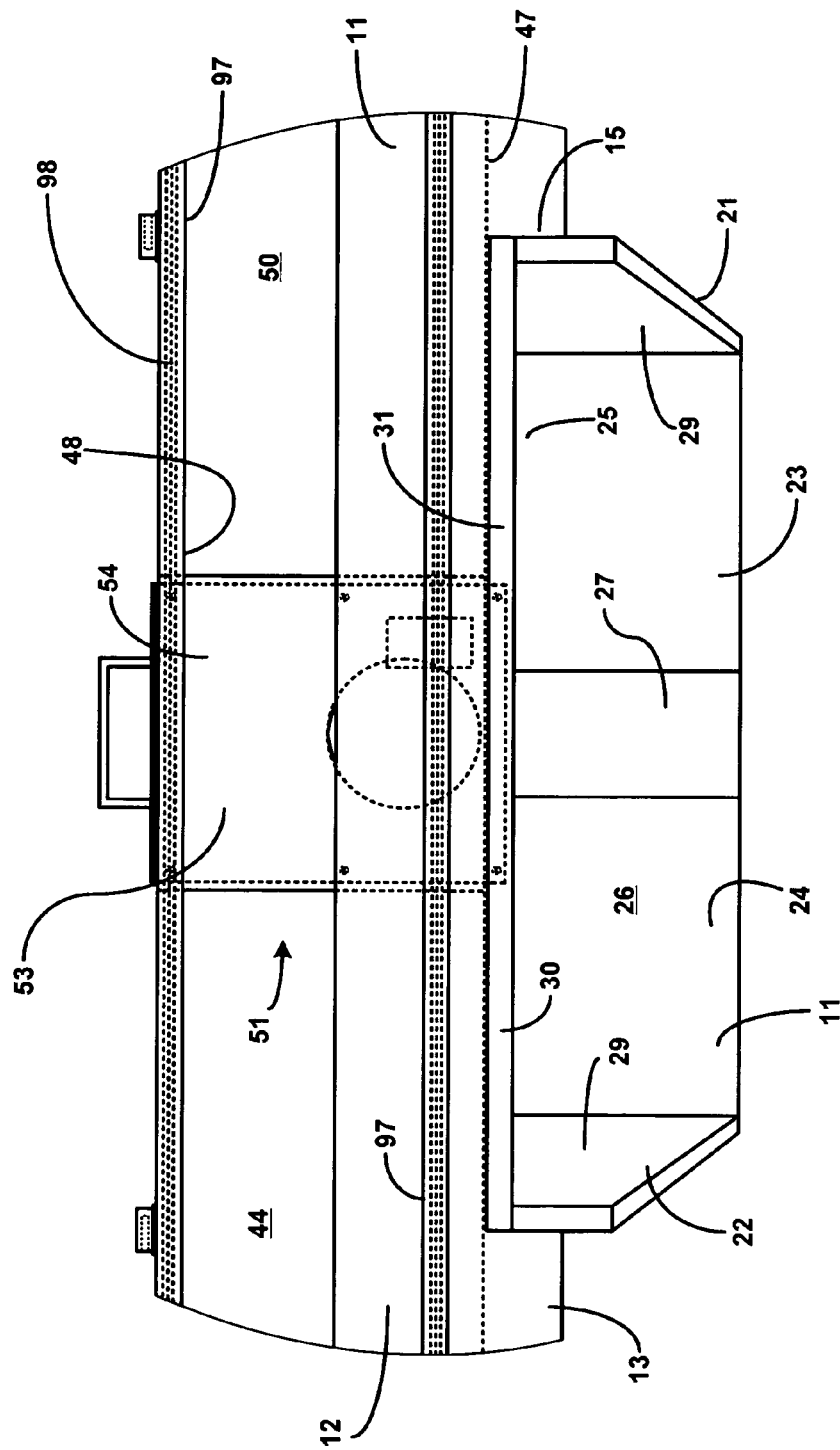
FIG. 3A shows, in a detail view taken from FIG. 3, various aspects of the most preferred implementation of the integral feeder and bumper assembly of FIG. 1 and, in particular, the placement of the spreader cartridge forming a part of the most preferred implementation.

As shown in the figures, the integration according to the present invention of the hopper 46 and the impact member 11 is such that the structural integrity of the resulting feeder and bumper assembly 10 is substantially the same as available in other bumper structures. In particular, the impact member 11 of the preferred implementation of the present invention comprises a horizontally extending impact element 12, which preferably is constructed as a transversely oriented, tubular steel bumper beam 13 manufactured from schedule 40 grade steel, and a vertically subtending impact element 21, which preferably serves also as a hitch plate 22. As particularly shown in FIGS. 3 and 3A, the vertically subtending impact element 21 is formed as a winged angle plate 23 of preferably one half (0.5) inch thick steel plat shaped by bending or the like to form a substantially horizontally disposed bottom plate portion 24, which may form a step for facilitating access to the rear area of the vehicle 96, and a plurality of sides 29. The rear edge 25 of the winged angle plate 23 is preferably welded to a back plate 30, also preferably constructed of schedule 40 grade steel, which back plate 30 is shaped and sized to conform to the rear edge 25 of the winged angle plate 23. The vertically subtending impact element 21 is then conventionally received and welded about its upper edge 31 into a slight notch 15 provided in the front, central portion of the transversely oriented, tubular steel bumper beam 13.

Finally, as also shown in the referenced figures and also in FIG. 4, there is provided a plurality of mounting structures 19 adapted to affix the impact member 11 to the frame or other appropriate point of fixation of the vehicle 96. In the preferred implementation shown and described, the provided mounting structures comprise preferably one half (0.5) inch thick steel plate rails 20 welded at one end of each about and to the top edge 16, rear side 18 and bottom edge 17 of the transversely oriented, tubular steel bumper beam 13. The opposite ends of the rails 20, which extend out of the hopper 46 through slotted openings 42 through the rear skirt 36 (described further herein) are then conventionally affixed to the vehicle 96.

In order to provide a conventional and aesthetically pleasing appearance for the integral animal feeder and bumper assembly 10 of the present invention, the impact member 11 is provided with a plurality of aesthetic coverings. As particularly shown in FIGS. 2 through 4, the impact member 11 is largely (although, as a matter of design choice, not completely) covered by a front skirt 35, a rear skirt 36, side skirts 44 and a bottom covering 45. As also shown in the referenced figures, however, it is noted that the provided aesthetic coverings are specifically formed so as to also function in cooperation with the structure of the impact member 11 as major components of the hopper 46 of the present invention. In particular, the front wall 47 of the hopper 46 is substantially coextensive with the rear side 18 and bottom edge 17 of the horizontally extending impact element 11 and the front skirt 35 dependently supported thereby; the rear wall 48 of the hopper 46 is substantially coextensive with the rear skirt 36; and the side walls 49 of the hopper 46 are substantially coextensive with the side skirts 44. Additionally, the bottom 50 of the hopper may be substantially coextensive with the bottom covering 45, as shown in the figures, or, in order to provide increased slant toward the central area 51 of the bottom 50 of the hopper 46, the bottom 50 may be formed as an additional component located within the provided aesthetic coverings. Finally, there is provided for the hopper 46 a hingedly affixed lid 52, which not only forms an aesthetically pleasing top portion for the bumper structure, but preferably is also constructed of sufficient rigidity to also serve as a step for facilitating access to the rear of the vehicle 96 upon which is mounted the integral feeder and bumper assembly 10. As particularly shown in FIGS. 3 and 3A, this uppermost edge of the hopper may be formed as a slightly widened rim 97, which, in order to protect the foodstuff contained in the hopper from adverse weather and the like, may be provided with a seal 98 such as, for example, weather stripping or the like. In any case, the provided lid 52 is readily affixed to the hopper 46 by providing a plurality of pin hinges 43 (or the substantial equivalent thereof) about the upper edge 41 of the rear skirt.

As previously mentioned, the present invention also comprises a dispenser 53 adapted to selectively discharge from the hopper 46 foodstuff contained in the hopper 46. While such a dispenser 53 may comprise a blower assembly or even a simple gate mechanism should be considered within the scope of the present invention), the preferred implementation of the present invention as now shown and described includes a spreader assembly 54. Additionally, in the most preferred implementation of the present invention, the spreader assembly 54 (or other powered dispenser as may be implemented) is formed as part of a cartridge 55, which cartridge 55 selectively removable from the hopper 46 for use in other applications such as, for example, in connection with a traditional stand mounted game feeder.

Figure 5:
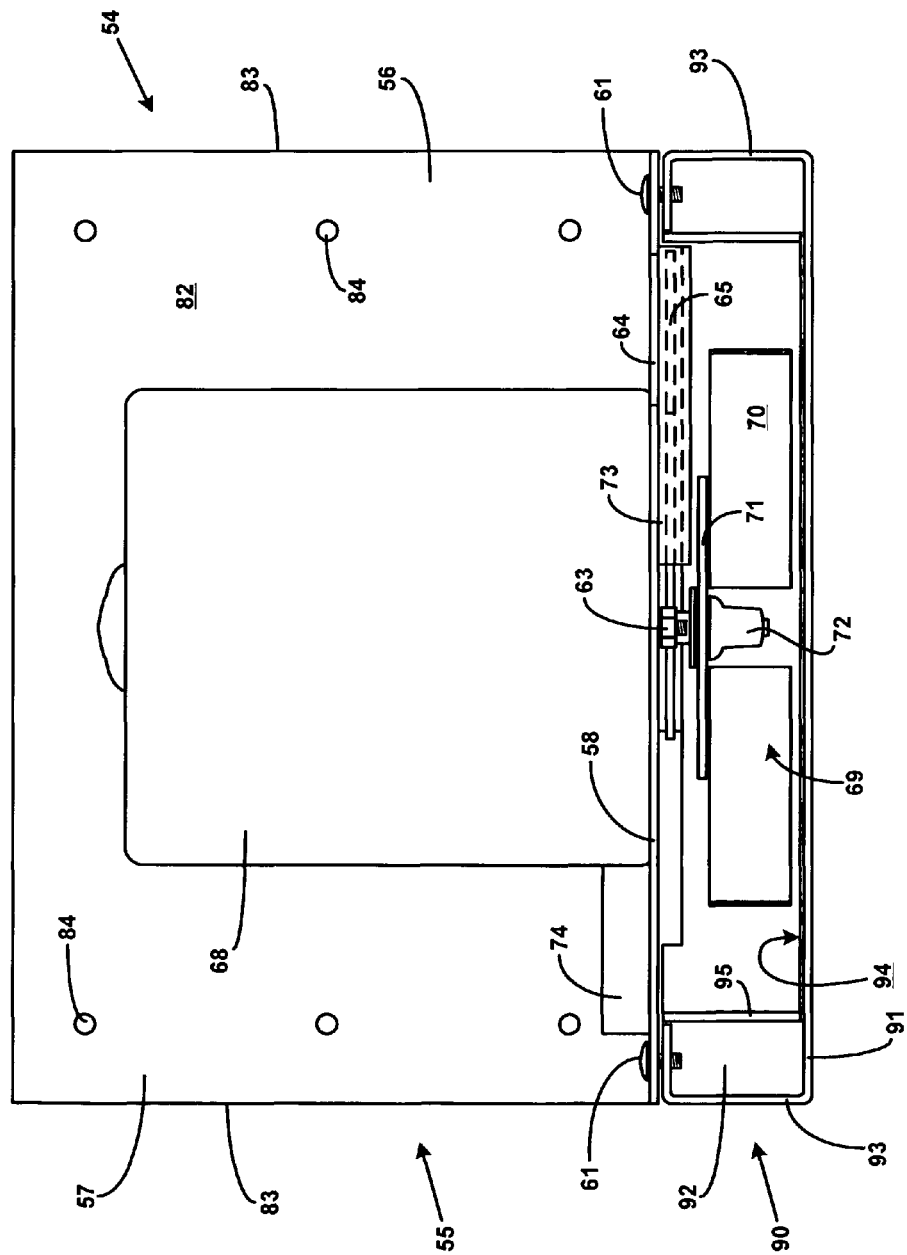
FIG. 5 shows, in a front elevational view, various details of one preferred implementation of the spreader cartridge forming a part of the most preferred implementation of the integral feeder and bumper assembly of the present invention.
Figure 6:
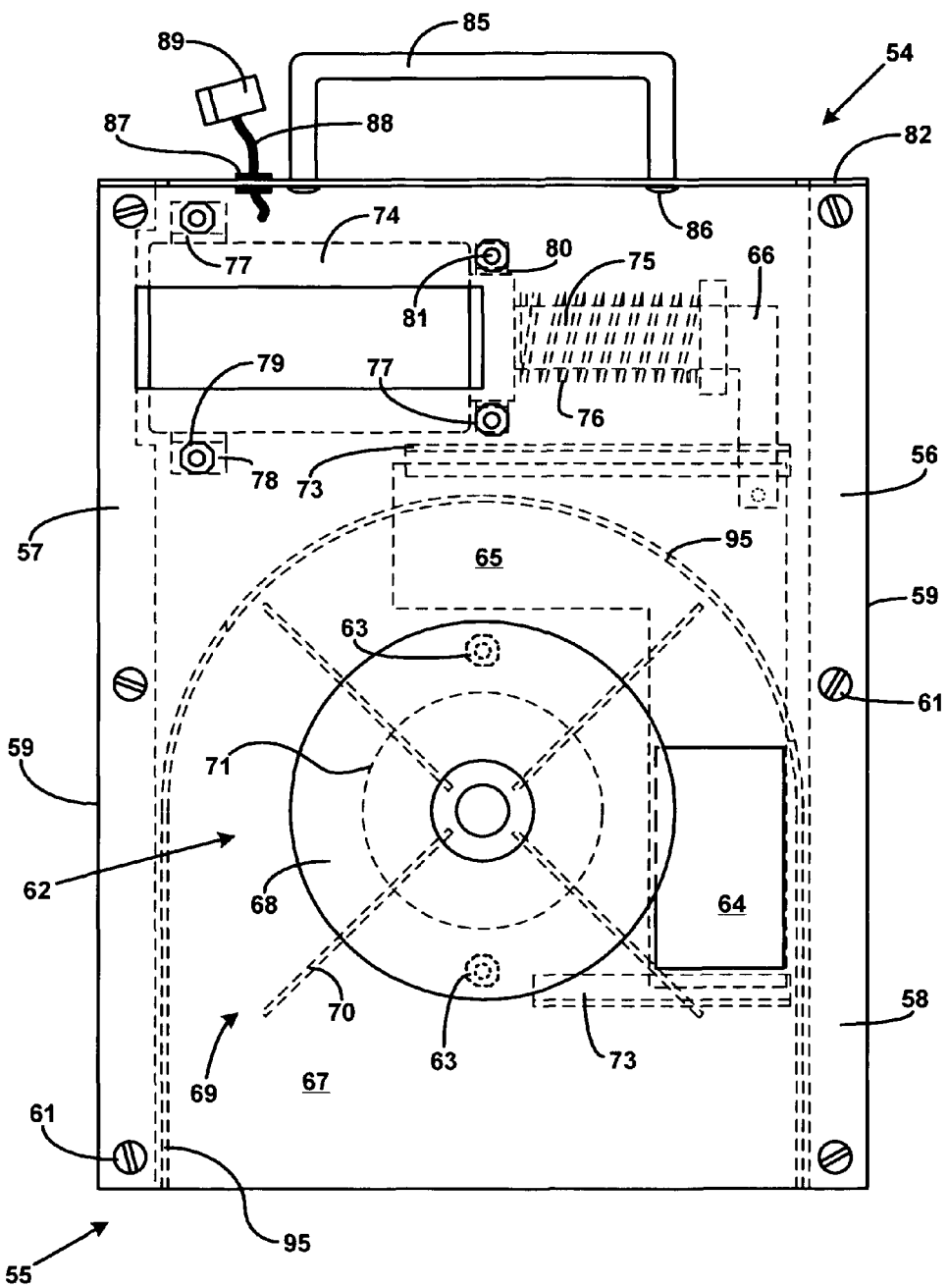
FIG. 6 shows, in a top plan view, various additional details of the spreader cartridge of FIG. 5.

As particularly shown in FIGS. 5 and 6, the spreader assembly 54 as implemented according to the most preferred embodiment of the present invention generally comprises a spreader mounting plate 56, which may be simply formed from an L-shaped aluminum sheet 57, and a preferably selectively detachable directional channel 90 affixed to the underside of the base 58 of the sheet 57. As shown in the referenced figures, the directional channel 90, which is preferably simply formed of an aluminum sheet 91, is bent or otherwise shaped about its rear edge 92 and side edges 93 in order to form a landing for supporting the longitudinal edges 59 in particular of the base 58 of the spreader mounting plate 56. Conventional mounting hardware 61 such as, for example, sheet metal or machine screws, is then utilized in cooperation with mounting hole 60 provide adjacent the longitudinal edges 59 of the base 58 of the spreader mounting plate 56 in order to removably attach the directional channel 90 to the underside of the base 58 of the spreader mounting plate 56. As will be appreciated by those of ordinary skill in the art, especially in light of this exemplary description, this feature enables the directional channel 90 to be selectively removed from the spreader mounting plate 56 in circumstances of the cartridge 55 being removed from the hopper for utilization in applications in which such a directional channel 90.

As also shown in the referenced figures, the spreader assembly 54 comprises a preferably 12-VDC electric motor 68 affixed to the top side 67 of the base 58 of the spreader mounting plate 56 by, for example, utilizing conventional mounting hardware 63 such as, for example, nuts adapted to engage threaded pins conventionally provided on and extending from the base of the selected motor 68. Additionally, the spreader assembly 54 comprises a spreader wheel 69, which may be simply constructed as a one or more paddles 70 affixed to a mounting disk 72. The spreader wheel 69 is attached (on the underside of the base 58 of the spreader mounting plate 56) to the shaft of the motor 68, also utilizing conventional mounting hardware 72. In any case, the directional channel 90 as preferably implemented comprises a curved chute 95 formed of aluminum sheet material or the like, which is welded or otherwise affixed to the top, base surface 94 of the sheet 91 and substantially embraces the path of the paddles 70 of the spreader wheel 69 about the rear portion of the spreader assembly 54, but is open in the front portion of the spreader assembly 54.

In order to enable dispensation from the hopper 46 of foodstuff contained therein, there is provided preferably in the front, central portion 62 of the base 58 of the spreader mounting plate 56 a foodstuff aperture 64. In order to control dispensation, however, there is also provided a translatable gate 65, which may be positioned utilizing a plurality of gate supporting slots 73 affixed to the underside of the base 58. In the preferred implementation, the translatable gate 65 is interconnected through an actuator arm 66 to the plunger 75 of a provided solenoid 74. The solenoid 74, which preferably comprises 12-VDC, continuous duty solenoid having a stroke length of approximately one inch and is preferably fitted with a spring kit 76, is preferably mounted to the underside of the base 58 adjacent to the back wall 82 of the spreader mounting plate 56 utilizing conventional mounting hardware 77 such as, for example, a clamp 78 with nut and bolt combinations 79 and/or a collar 80 with nut and bolt combinations 81. As will be appreciated by those of ordinary skill in the art, electrical actuation of the solenoid 74 in order to draw the plunger 75 into the barrel thereof will cause the translatable gate 65 to move from under the foodstuff aperture 64 allowing dispensation of foodstuff from the hopper. Substantially simultaneous electrical actuation of the electric motor 68 will then drive the spreader wheel 69 to forcefully eject the dispensed foodstuff from within the directional channel 90. As shown in FIGS. 1 and 2, in particular, the described configuration of the integral animal feeder and bumper assembly 10 of the present invention is such that the ejected foodstuff will be generally thrown rearward from the vehicle from the underside 28 of the hitch plate 22. Upon removal of electrical power to the solenoid 74, the spring kit 76 will then cause the gate 65 to be once again moved into place beneath the foodstuff aperture 64, thereby terminating the dispensation.

Figure 4A:
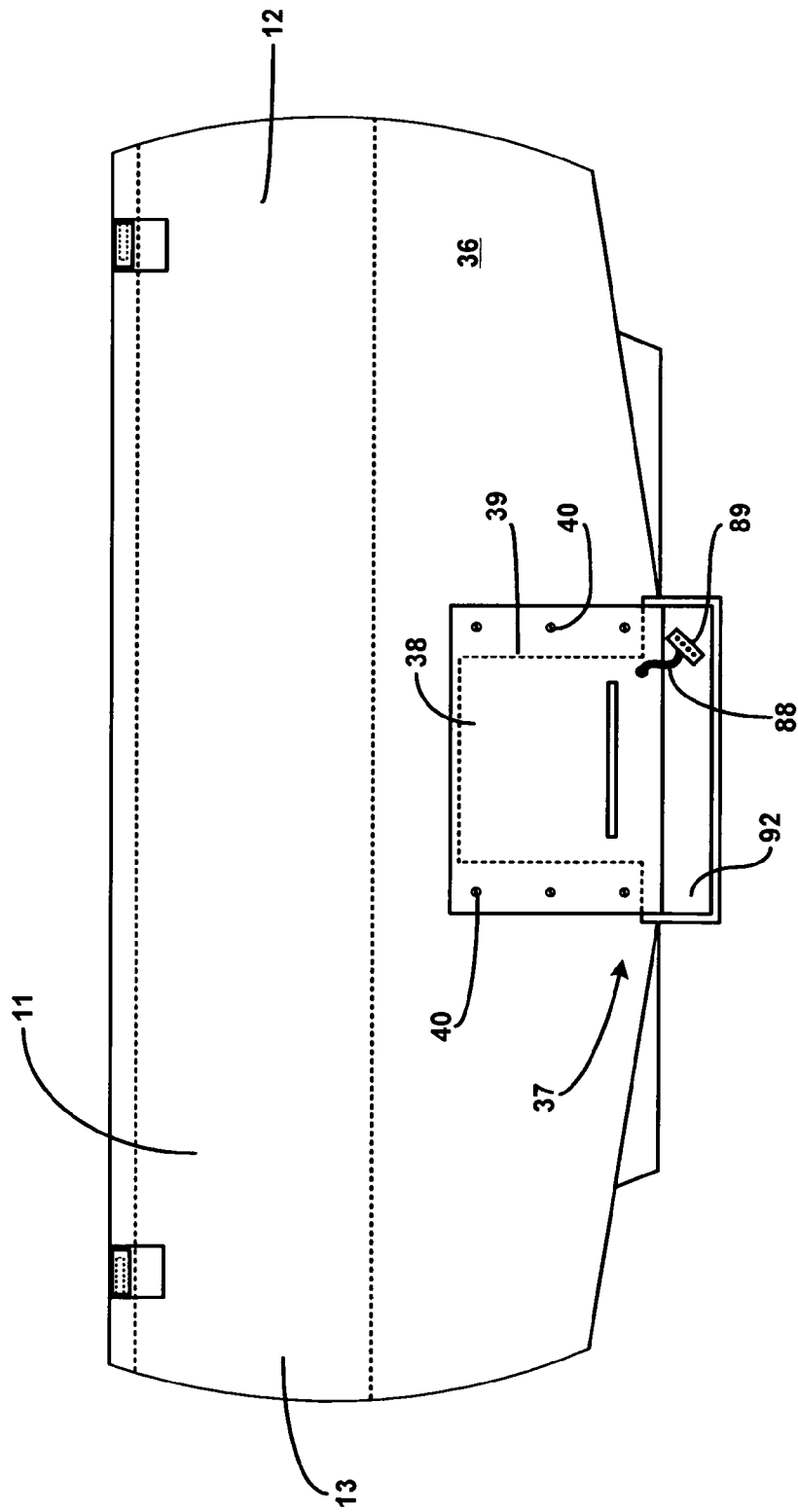
FIG. 4A shows, in a detail view taken from FIG. 4, various additional aspects of the most preferred implementation of the integral feeder and bumper assembly of FIG. 1 and, in particular, additional aspects of the preferred placement of the spreader cartridge.

Finally, as particularly shown in FIG. 4A, provision is made for facilitating the quick and easy removal from the hopper 46 of the cartridge 55. In particular, an opening 38 is provided in the lower, central area 37 of the rear skirt 36 of the integral animal feeder and bumper assembly 10 of the present invention, which opening 38 is sized and shaped to received therein the bulk of the cartridge 55. Additionally, a plurality of tapped holes 40 are provided about the vertical edges 39 of the opening 38, which tapped holes 40 are adapted to receive screws or the like inserted through corresponding holes 84 along the vertical edges 83 of the back wall 82 of the spreader mounting plate 56. In this manner, the cartridge 55 may be readily removed from the hopper 46 be removing the mounting hardware, disconnecting the quick-connect style plug 89 utilized to interconnect the animal feeder and bumper assembly 10 to the electrical system of the vehicle 96 and sliding the cartridge 55 out of the rear of the hopper 46. To facilitate this operation further, a wire pull 85 or the like may be readily attached to the back wall 82 of the spreader mounting plate 56 with conventional mounting hardware 86 such a, for example, machine screws.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, a receiver hitch tube 27 is readily provided with the described implementation of the present invention by welding or otherwise attaching the receiver hitch tube 27 to the top face 26 of the substantially horizontally disposed bottom plate portion 24 of the provided hitch plate 22 Likewise, conventional license plate mounting hardware is readily provided in the upper portion 33 of the front face 32 of the back plate 30 of the provided hitch plate 22 in order to dependently receive, and properly and legally display, a license plate 34 associated with the vehicle 96. Still further, those of ordinary skill in the art will recognize that the electrical wiring 88 from the cartridge 55 may be conventionally protected with a grommet 87 or the like and/or the front skirt 35 or other structures may be otherwise conventionally fitted with auxiliary electrical connection such as, for example, for trailer lights and the like, or other devices such as, for example, proximity sensors, auxiliary lights or the like. In any case, because the scope of the present invention is much broader than any particular embodiment, the foregoing detailed description should not be construed as a limitation of the scope of the present invention, which is limited only by the claims appended hereto.

What is claimed is:

1. An integral animal feeder and bumper assembly, said integral animal feeder and bumper assembly comprising:
    a bumper adapted to fend off blows to a land vehicle;
    a hopper adapted to store therein a quantity of substantially granular foodstuff;
    a spreader assembly adapted to selectively discharge from said hopper foodstuff contained in said hopper; and
    wherein:
        said spreader assembly comprises:
            a directional channel, said directional channel having provided therein a spreader wheel;
            an electric motor, said electric motor being operably coupled to said spreader wheel; and
            a foodstuff aperture, said foodstuff aperture being configured to allow dispensation of foodstuff from within said hopper into said directional channel; and said hopper is substantially enclosed within said bumper.

2. The integral animal feeder and bumper assembly as recited in claim 1, wherein said bumper comprises an impact member.

3. The integral animal feeder and bumper assembly as recited in claim 2, wherein said impact member comprises a substantially horizontal impact element.

4. The integral animal feeder and bumper assembly as recited in claim 3, wherein said substantially horizontal impact element comprises a tubular steel beam.

5. The integral animal feeder and bumper assembly as recited in claim 3, wherein said impact member further comprises a substantially vertical impact element subtending from said substantially horizontal impact element.

6. The integral animal feeder and bumper assembly as recited in claim 5, wherein said substantially vertical impact element comprises a hitch plate.

7. The integral animal feeder and bumper assembly as recited in claim 1, wherein said spreader assembly comprises a gate, said translatable gate being adapted to selectively cover said foodstuff aperture.

8. The integral animal feeder and bumper assembly as recited in claim 1, wherein said spreader assembly is selectively detachable from said integral animal feeder and bumper assembly.

9. An integral animal feeder and bumper assembly, said integral animal feeder and bumper assembly comprising:
    a rear bumper adapted to fend off blows to the rear end of a land vehicle;
    a hopper adapted to store therein a quantity of substantially granular foodstuff;
    a dispenser adapted to selectively discharge from said hopper foodstuff contained in said hopper; and
    wherein said hopper is substantially enclosed within said rear bumper.

10. The integral animal feeder and bumper assembly as recited in claim 9, wherein said rear bumper comprises an impact member.

11. The integral animal feeder and bumper assembly as recited in claim 10, wherein said impact member comprises a substantially horizontal impact element.

12. The integral animal feeder and bumper assembly as recited in claim 11, wherein said substantially horizontal impact element comprises a tubular steel beam.

13. The integral animal feeder and bumper assembly as recited in claim 11, wherein said impact member further comprises a substantially vertical impact element subtending from said substantially horizontal impact element.

14. The integral animal feeder and bumper assembly as recited in claim 13, wherein said substantially vertical impact element comprises a hitch plate.

15. The integral animal feeder and bumper assembly as recited in claim 9, wherein said dispenser comprises a blower.

16. The integral animal feeder and bumper assembly as recited in claim 9, wherein:
said dispenser comprises a spreader assembly; and
said spreader assembly comprises:
  a directional channel, said directional channel having provided therein a spreader wheel;
  an electric motor, said electric motor being operably coupled to said spreader wheel; and
  a foodstuff aperture, said foodstuff aperture being configured to allow dispensation of foodstuff from within said hopper into said directional channel.

17. The integral animal feeder and bumper assembly as recited in claim 16, wherein said dispenser comprises a translatable gate, said translatable gate being adapted to selectively cover said foodstuff aperture.

18. The integral animal feeder and bumper assembly as recited in claim 9, wherein said dispenser is selectively detachable from said integral animal feeder and bumper assembly.

19. The integral animal feeder and bumper assembly as recited in claim 10, wherein said rear bumper comprises at least one aesthetic covering.

20. A method for dispensing animal foodstuff from a land vehicle, said method for dispensing animal foodstuff from a land vehicle comprising the steps of:
introducing a quantity of substantially granular animal foodstuff into a hopper, said hopper being formed within an integral animal feeder and bumper assembly comprising:
  a bumper adapted to fend off blows to the land vehicle;
  a dispenser adapted to selectively discharge from said hopper foodstuff contained in said hopper; and
  wherein said hopper is substantially enclosed within said bumper; and
discharging from said hopper a portion of said quantity of substantially granular animal foodstuff.

21. The method for dispensing animal foodstuff from a land vehicle as recited in claim 20, wherein:
said dispenser comprises a spreader assembly, said spreader assembly comprising:
  a directional channel, said directional channel having provided therein a spreader wheel;
  an electric motor, said electric motor being operably coupled to said spreader wheel;
  a foodstuff aperture, said foodstuff aperture being configured to allow dispensation of foodstuff from within said hopper into said directional channel; and
  a translatable gate, said translatable gate being adapted to selectively cover said foodstuff aperture; and
said discharging step comprises the steps of:
  translating said translatable gate to open said foodstuff aperture, thereby allowing dispensation of foodstuff from within said hopper into said directional channel; and
  activating said electric motor to operate said spreader wheel, thereby ejecting from said directional channel the foodstuff dispensed therein.

* * * * *